(12) United States Patent
Kim

(10) Patent No.: US 7,583,798 B2
(45) Date of Patent: Sep. 1, 2009

(54) APPARATUS FOR PROTECTING MULTI-FUNCTION PRODUCTS FROM SURGE VOLTAGE

(75) Inventor: Eog-kyu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1010 days.

(21) Appl. No.: 11/168,414

(22) Filed: Jun. 29, 2005

(65) Prior Publication Data
US 2006/0002544 A1 Jan. 5, 2006

(30) Foreign Application Priority Data
Jul. 1, 2004 (KR) .................. 10-2004-0051003

(51) Int. Cl.
*H04M 1/00* (2006.01)
(52) U.S. Cl. ...................................... 379/412; 379/331
(58) Field of Classification Search ................. 379/412, 379/377, 331, 315, 317
See application file for complete search history.

(56) References Cited

U.S. PATENT DOCUMENTS 6,259,589 B1 * 7/2001 Chao .......................... 361/119
6,359,973 B1 3/2002 Rahamim et al.

FOREIGN PATENT DOCUMENTS

| JP | 2003-164059 | 6/2003 |
|---|---|---|
| KR | 91-17712 | 11/1991 |
| KR | 94-3303 | 2/1994 |
| KR | 1999-021001 | 3/1999 |
| KR | 2001-0001260 | 1/2001 |
| KR | 2003-0029736 | 4/2003 |

* cited by examiner

*Primary Examiner*—Creighton Smith
(74) *Attorney, Agent, or Firm*—Staas & Halsey LLP

(57) ABSTRACT

Provided is an apparatus for protecting a multi-function product from surge voltage, the multi-function product including a public telephone network connection unit which receives one of a ring signal, a voice signal, and a fax signal and transmits the signal via first and second signal lines and an external apparatus connection unit which is connected to an external apparatus, receives a data signal from the external apparatus, and transmits the data signal via the first and second signal lines, the apparatus including: a first surge voltage cut off device having first and second terminals, wherein the first terminal is connected to the first signal line and the second terminal is connected to the second signal line; a second surge voltage cut off device having first and second terminals, wherein the first terminal is connected to the first signal line; a switching unit having a first terminal connected to the second signal line and a second terminal connected to one of a first contact point connected to the external apparatus connection unit and a second contact point connected to the second terminal of the second surge voltage cut off device; and a control unit which senses a signal received from the multi-function product and controls the second terminal of the switching unit to be switched between one of the first contact point and the second contact point.

10 Claims, 5 Drawing Sheets

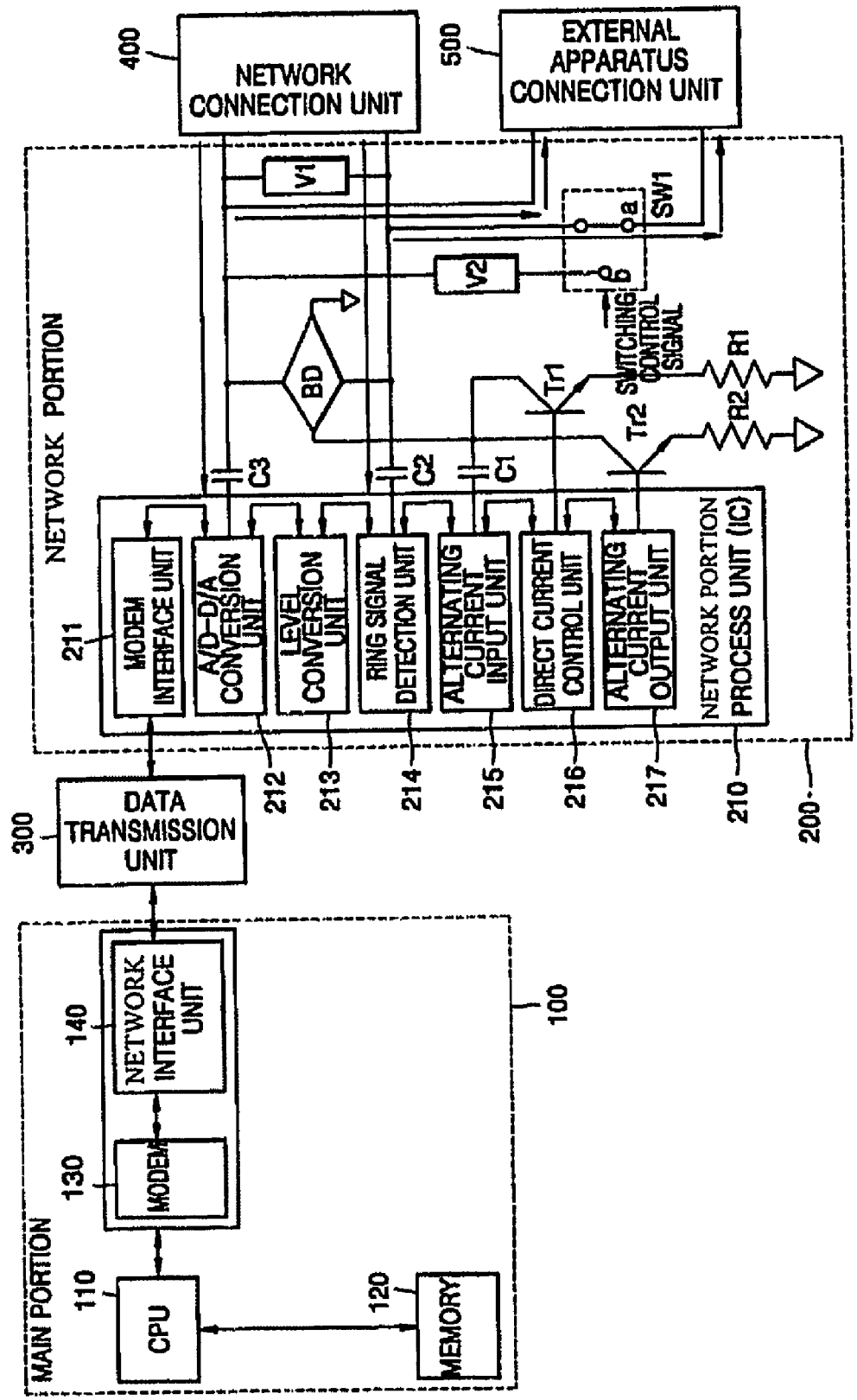

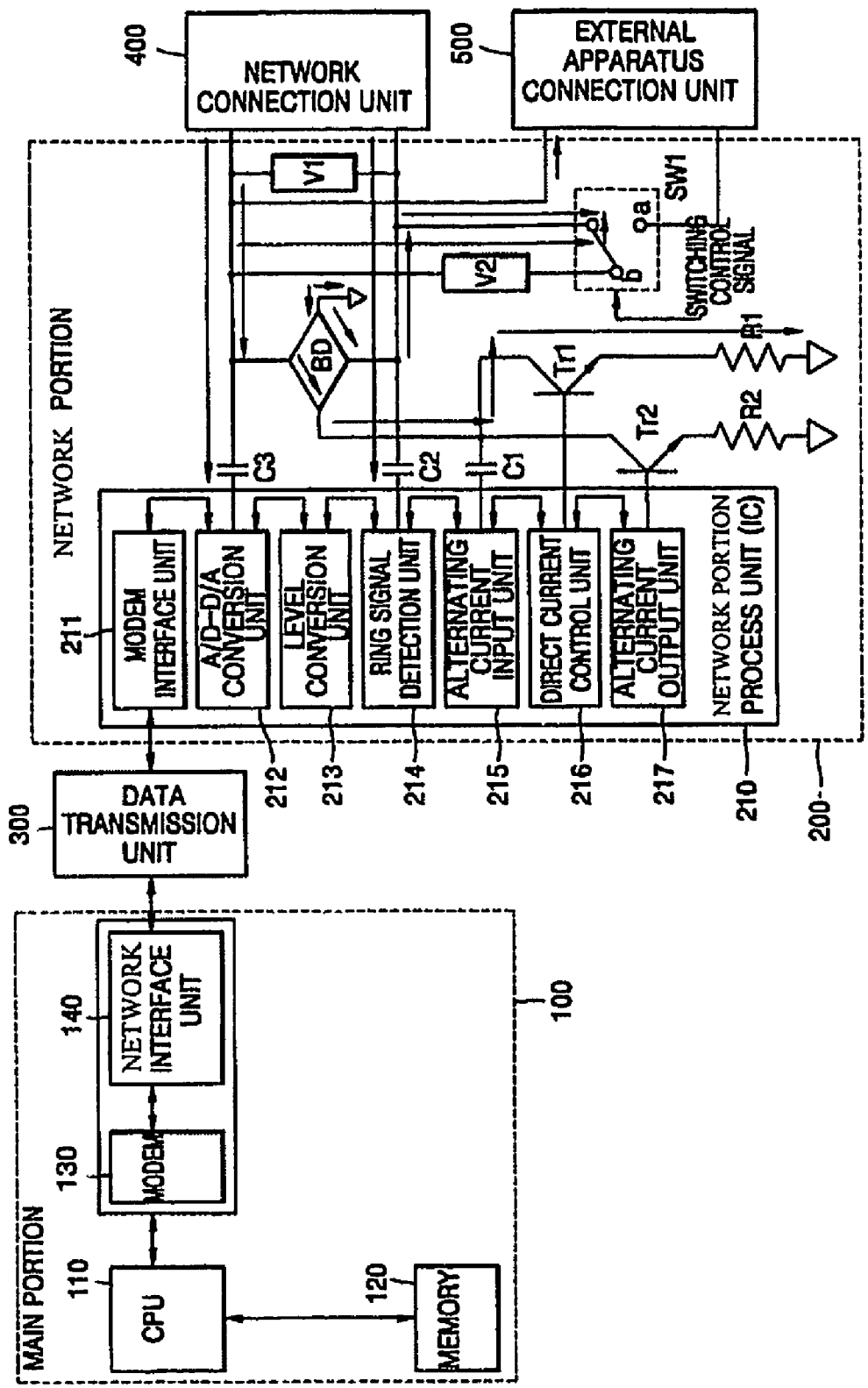

APPARATUS FOR PROTECTING MULTI-FUNCTION PRODUCTS FROM SURGE VOLTAGE

CROSS-REFERENCE TO RELATED APPLICATION

This application claims the benefit of Korean Patent Application No. 10-2004-0051003, filed on Jul. 1, 2004, in the Korean Intellectual Property Office, the disclosure of which is incorporated herein in its entirety by reference.

BACKGROUND OF THE INVENTION

1. Field of the Invention

The present invention relates to a multi-function product, and more particularly, to an apparatus for protecting a multi-function product connected to a network to perform an appropriate function from a surge voltage in the public telephone network, and sectionalizing the multi-function product into an idle state and a loop state.

2. Description of the Related Art

Multi-function products (MFP) such as office automation instruments can perform a number of functions such as a telephone function, a printer function, a copier function, a scanner function, and a fax function.

FIG. 1 is a block diagram showing a configuration of a conventional apparatus for protecting an MFP from a surge voltage. The apparatus for protecting the MFP from the surge voltage can also be applied to general digital copiers and scanners. Here, for example, an MFP is described.

Referring to FIG. 1, the MFP includes a main portion 100, a network portion 200, a data transmission unit 300 transmitting data between the main portion 100 and the network portion 200, a public telephone network connection unit 400, and an external apparatus connection unit 500.

The main portion 100 generally includes a central processing unit (CPU) 110, a memory 120, a modem 130, and a network interface unit 140.

The network portion 200 includes a network portion processing device (IC) 210 which is equipped with a modem interface unit 211, an A/D-D/A conversion unit 212, a level conversion unit 213, a ring signal detection unit 214, an alternating current signal input unit 215, a direct current control unit 216, and an alternating current signal output unit 217, a bridge diode BD, capacitors C1, C2, and C3, resistors R1 and R2, transistors Tr1 and Tr2, a surge voltage cut-off device V1, and a switching unit SW1.

The data transmission unit 300 is interposed between the main portion 100 and the network portion 200, and the data transmission unit 300 transfers arranged data signals and clock signals.

The main portion 100 processes fax signals and aural signals. The modem unit 130 is connected with the data transmission unit 300 via the network interface unit 140 and sends/receives fax signals and aural signals.

The bridge diode BD of the network portion 200 always applies a forward voltage to the transistors Tr1 and Tr2 even if the polarity of a switching system connected to the public telephone network connection unit 400 is reversed. The transistor Tr1, the resistor R1, and the direct current control unit 216 allow a predetermined direct current to flow into the public telephone network connection unit 400. The transistor Tr2 and the resistor R2 amplify alternating current signals output from the alternating current signal output unit 217 and send them to the public telephone network connection unit 400. The capacitor C1 removes a direct current component from alternating current signals input via the public telephone network connection unit 400 and delivers them to the alternating current signal input unit 215. The capacitors C1 and C2 deliver ring signals input from the public telephone network connection unit 400 to the signal detection unit 214. The surge voltage cut off device V1 protects the network portion process device (IC) 210 from a surge voltage input from the public telephone network connection unit 400. Generally, a varistor or a gas tube is used as the surge voltage cut off device V1. The switching unit SW1 switches to connect an external apparatus and a multi-function product via the external apparatus connection unit 500 when an additional external apparatus is connected to the multi-function product.

In a multi-function product using the network portion process device (IC) 210, the surge voltage cut off device V1 is arranged adjacent to the public telephone network connection unit 400 in order to protect the network portion process device (IC) 210 from the surge voltage input from the public telephone network connection unit 400. In a multi-function product using the network portion process device (IC) 210, when the surge voltage cut off device V1 is connected between a ring signal path and a loop current path, a device having an operating voltage greater than the peak value of the ring signal is used as the surge voltage cut off device V1. For example, since a peak value of the ring voltage is 212V when the ring voltage is 150V, the surge voltage cut off device V1 must be used at least 212V.

In an idle state (a current path like a dotted line of FIG. 1) in which a voice or a fax signal is not sent/received in the multi-function product, since transistors Tr1 and Tr2 are all off, the multi-function product becomes in a high impedance state and a surge voltage current input from the network connection unit 400 becomes insignificant. Therefore, the line portion process device (IC) 210 can be protected by the surge voltage cut off device V1.

However, in a loop state (a current path like a solid line of FIG. 1) in which a voice or a fax signal is sent/received via in the multi-function product, since a terminal enters a low impedance state, surge voltage, that is, a high current instantly, flows from the network connection unit 400, and thus the network portion process device (IC) 210 can be damaged. To prevent this, an input path and a grounding path of the line portion process device (IC) 210 have to be sufficiently isolated from a path into which surge voltage is input. However, to make a design as described above, there are many restrictions in component arrangement or layout.

SUMMARY OF THE INVENTION

Additional aspects and/or advantages of the invention will be set forth in part in the description which follows and, in part, will be obvious from the description, or may be learned by practice of the invention.

The present invention provides an apparatus to protect a multi-function product connected to a public telephone network and performing relevant functions from surge voltage flowing from the public telephone network according to whether the multi-function product is in an idle state or a loop state.

According to an aspect of the present invention, there is provided an apparatus for protecting a multi-function product from a surge voltage, the multi-function product including a network connection unit which receives either a ring signal, a voice signal, and a fax signal and transmits the signal via first and second signal lines and an external apparatus connection unit which is connected to an external apparatus, receives a data signal from the external apparatus, and transmits the data signal via the first and second signal lines, the apparatus including: a first surge voltage cut off device having first and second terminals, wherein the first terminal is connected to the first signal line and the second terminal is connected to the second signal line; a second surge voltage cut off device having first and second terminals, wherein the first terminal is connected to the first signal line; a switching unit having a first terminal connected to the second signal line and a second terminal connected to one of a first contact point connected to the external apparatus connection unit and a second contact point connected to the second terminal of the second surge voltage cut off device; and a control unit which senses a signal received from the multi-function product and controls the second terminal of the switching unit to be switched between one of the first contact point and the second contact point.

The control unit may control the second terminal of the switching unit to be switched to the first contact point in a idle state or when a ring signal is received from the public telephone network connection unit, and control the second terminal of the switching unit to be switched to the second contact point when a voice or a fax signal is received from the public telephone network connection unit.

According to another aspect of the present invention, there is provided an apparatus for protecting a multi-function product from surge voltage, the multi-function product including a public telephone network connection unit which receives one of a ring signal, a voice signal, and a fax signal and transmits the signal via first and second signal lines and an external apparatus connection unit which is connected to an external apparatus, receives a data signal from the external apparatus, and transmits the data signal via the first and second signal lines, the apparatus including: a first surge voltage cut off device having first and second terminals, wherein the first terminal is connected to the first signal line and the second terminal is connected to the second signal line; a second surge voltage cut off device having first and second terminals, wherein the first terminal is connected to the first signal line; a switching unit having a first terminal connected to the first signal line, a second terminal including a first contact point connected to the external apparatus, a third terminal connected to the second signal line, and a fourth terminal including a second contact point connected to the external apparatus connection unit and a third contact point connected to the second terminal of the second surge voltage cut off device; and a control unit which senses a signal received from the multi-function product and controls the second and fourth terminal of the switching unit to be switched between two of the first, second, and third contact points.

The control unit may control the second terminal of the switching unit to be switched to the first contact point and the fourth terminal of the switching unit to be switched to the second contact point in normal times or when a ring signal is received from the public telephone network connection unit, and control the second terminal of the switching unit to be switched to the first contact point and the fourth terminal of the switching unit to be switched to the third contact point when one of a voice or a fax signal is received from the public telephone network connection unit.

BRIEF DESCRIPTION OF THE DRAWINGS

These and/or other aspects and advantages of the invention will become apparent and more readily appreciated from the following description of the embodiments, taken in conjunction with the accompanying drawings of which:

The above and other features and advantages of the present invention will become more apparent by describing in detail exemplary embodiments thereof with reference to the attached drawings in which:

FIG. 3A is a diagram showing a voltage inflow path of FIG. 2 when an MFP is in an idle state;

FIG. 3B is a diagram showing a voltage inflow path of FIG. 2 when an MFP is in a loop state.

DETAILED DESCRIPTION OF THE PREFERRED EMBODIMENTS

Figure 1:
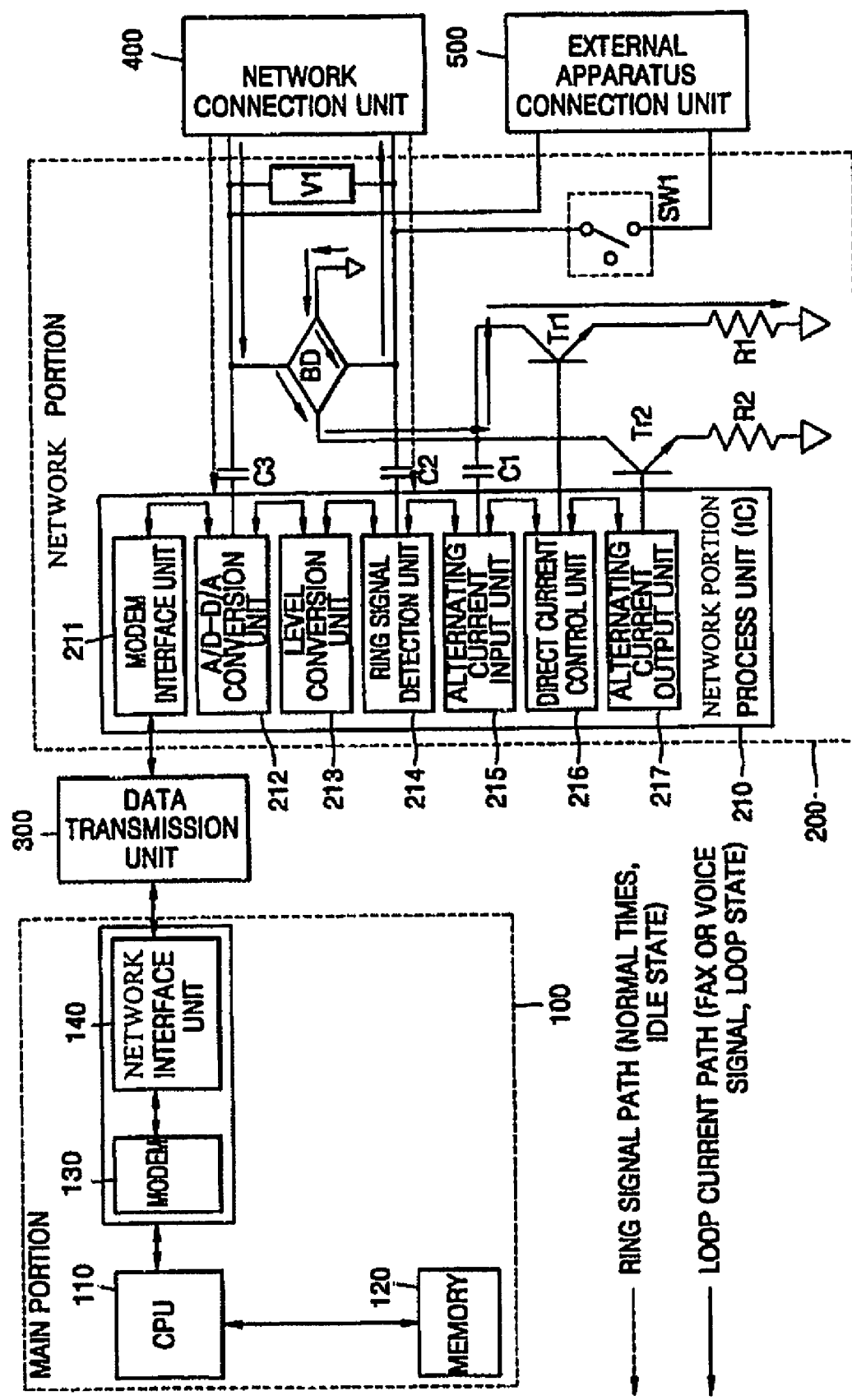
FIG. 1 is a block diagram showing a configuration of a conventional apparatus for protecting a multi-function product (MFP) a from surge voltage.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
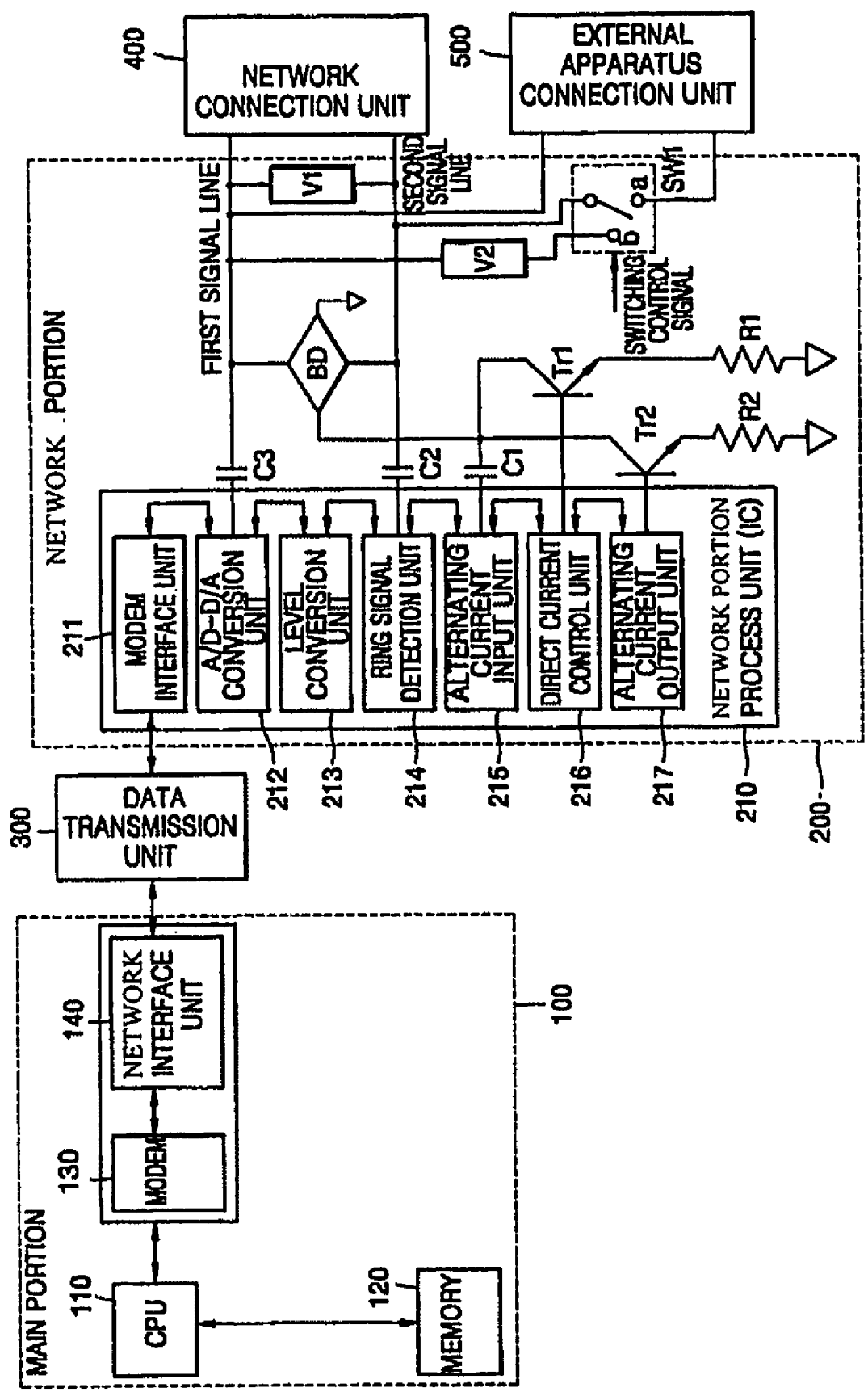
FIG. 2 is a block diagram showing a configuration of an apparatus for protecting an MFP from a surge voltage according to an embodiment of the present invention.

FIG. 2 is a block diagram showing a configuration of an apparatus for protecting a multi-function product (MFP) from a surge voltage according to an embodiment of the present invention.

The apparatus according to an embodiment of the present invention includes a main portion 100 and a network portion 200. Each component of the main portion 100 and network portion 200 is the same as a conventional component. In a conventional art, to protect a network portion process device (IC) 210 from a surge voltage input from a public telephone network connection unit 400, a surge voltage cut off device V1 is commonly used in an idle state or a loop state. However, according to an embodiment of the present invention, a surge voltage cut off device V2 is further applied in addition to the surge voltage cut off device V1.

According to an embodiment of the present invention, the surge voltage cut off device V1 is comprised of two terminals which are connected respectively to first and second signal lines of the network connection unit 400. The surge voltage cut off device V2 is comprised of two terminals which are connected respectively to the first signal line of the public telephone network connection unit 400 and a second contact point b of a switching unit SW1. A terminal of the switching unit SW1 is connected to the second signal line of the network connection unit 400, and the terminal is switched between one of a first contact point a connected to an external apparatus connection unit 500 and the second contact point b. In this case, a CPU 110 determines which state the MFP is in and outputs a switching control signal.

When a ring signal is received from the public telephone network connection unit 400, that is, when the MFP is in an idle state, the CPU 110 switches the switch to the first contact point a of the switching unit SW1 to be switched. When one of a voice or a fax signal is received from the public telephone network connection unit 400, that is, when the MFP is in a loop state, the CPU 110 switches the switch to the second contact point b.

FIG. 3A is a diagram showing a voltage inflow path of FIG. 2 when an MFP is in an idle state. When the MFP is in an idle state, a surge voltage is input into the same path as a path in which a ring signal is input. In this case, a voltage greater than a peak value of the ring signal is applied to the surge voltage cut off device V1. The switching unit SW1 is connected to the first contact point a such that the ring signal can be transmitted to an external apparatus connected to the external apparatus connection unit 500 in an idle state. When the switching unit SW1 is connected to the first contact point a, the surge voltage cut off device V2 enters in an open state and the surge voltage cut off device V2 is not affected by a ring input signal.

FIG. 3B is a diagram showing a voltage inflow path of FIG. 2 when an MFP is in a loop state. When the external apparatus connected via the external apparatus connection unit 500 is in an off-hook state during image data transmission, errors may occur in sending/receiving image data. To prevent errors, when the MFP is in a loop state, the switching unit SW1 is connected to the second contact point b to disconnect the external apparatus from the MFP. Since the switching unit SW1 is connected to the second contact point b, the surge voltage cut off device V2 is connected to a surge voltage path. Therefore, the surge voltage cut off device V2 is connected in a loop state and is not influenced by a ring signal.

As mentioned in the conventional art, since the MFP has a low impedance in a loop state, a device which can operate at a sufficiently low voltage is used as the surge voltage cut off device V2 in order to more properly protect the network portion process device (IC) 210.

Figure 4:
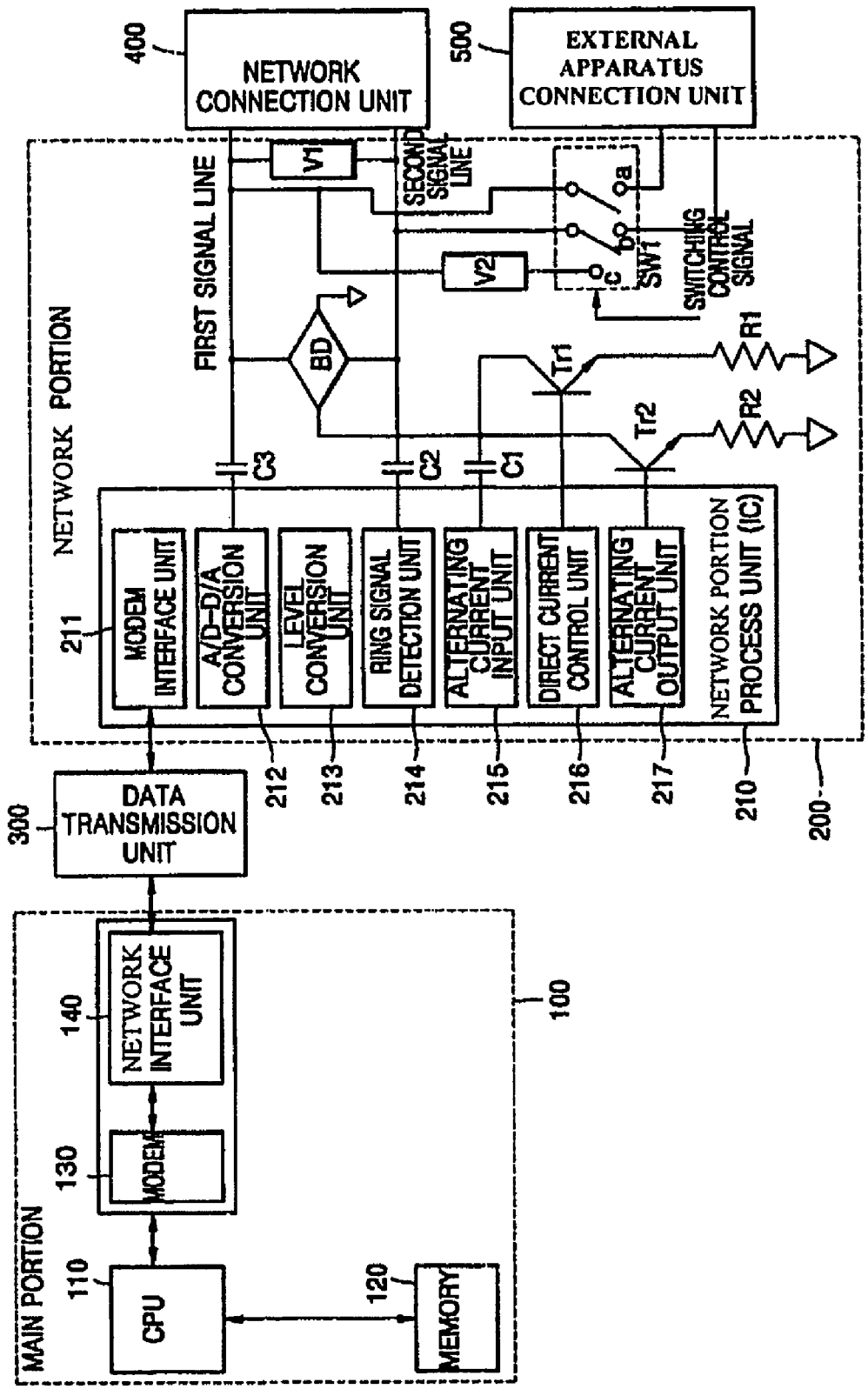
FIG. 4 is a block diagram showing a configuration of an apparatus for protecting an MFP from surge voltage according to another embodiment of the present invention.

FIG. 4 is a block diagram showing a configuration of an apparatus for protecting an MFP from a surge voltage according to another embodiment of the present invention. The surge voltage cut off device V1 is formed of one terminal and another terminal which are connected to the first and second signal lines of the public telephone network connection unit 400, respectively. The surge voltage cut off device V2 is comprised of two terminals which are connected respectively to the first signal line of the public telephone network connection unit 400 and a third contact point c of the switching unit SW1, respectively. A first terminal of the switching unit SW1 is connected to the first signal line of the public telephone network connection unit 400, and a second terminal of the switching unit SW1 including the first contact point a is connected to the external apparatus connection unit 500. A third terminal is connected to the second signal line of public telephone network connection unit 400, and a fourth terminal including the second contact point b is connected to the external apparatus connection unit 500. The third contact point c is connected to another terminal of the surge voltage cut off device V2 and is switched one of the two contact points by switching control signal. In this case, the CPU 110 determines the state of the MFP to output a switching control signal.

When a ring signal is received from the public telephone network connection unit 400, that is, when the MFP is in an idle state, the CPU 110 switches the first terminal of the switching unit SW1 between the first contact point a and the second contact point b. When a voice or fax signal is received from the public telephone network connection unit 400, that is, when the MFP is in a loop state, the CPU 110 switches the first terminal of the switching unit SW1 to the first contact point a and switches the third terminal to the third contact point c.

As described above, according to the present invention, a device value to be protected is differently applied according to whether the MFP is in an idle state or in a loop state, thereby protecting the MFP from the surge voltage. Also, a restriction, such as an excessive distance length in designing the MFP is minimized, thereby realizing facility of design.

While the present invention has been particularly shown and described with reference to exemplary embodiments thereof, it will be understood by those of ordinary skill in the art that various changes in form and details may be made therein without departing from the spirit and scope of the present invention as defined by the following claims.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for protecting a multi-function product from a surge voltage,
the multi-function product comprising a network connection unit which receives one of a ring signal, an information signal and transmits the signal via first and second signal lines and an external apparatus connection unit which is connected to an external apparatus, the apparatus comprising:
a first surge voltage cut off device having first and second terminals, wherein the first terminal is connected to the first signal line and the second terminal is connected to the second signal line;
a second surge voltage cut off device having first and second terminals, wherein the first terminal is connected to the first signal line;
a switching unit having a first terminal connected to the second signal line and a second terminal connected to one of a first contact point connected to the external apparatus connection unit and a second contact point connected to the second terminal of the second surge voltage cut off device; and
a control unit which senses a signal received from the multi-function product and controls the second terminal of the switching unit to be switched between one of the first contact point and the second contact point.

2. The apparatus of claim 1, wherein the control unit:
controls the second terminal of the switching unit to be switched to the first contact point in idle state or when the ring signal is received from the network connection unit; and
controls the second terminal of the switching unit to be switched to the second contact point when the information signal is received from the network connection unit.

3. The apparatus of claim 1, wherein the network connection unit is a telephone network connection unit.

4. The apparatus of claim 2, wherein the information signal is a voice or a fax signal.

5. An apparatus for protecting a multi-function product from surge voltage,
the multi-function product comprising a network connection unit which receives one of a ring signal, an information signal and transmits the signal via first and second signal lines and an external apparatus connection unit which is connected to an external apparatus, the apparatus comprising:
a first surge voltage cut off device having first and second terminals, wherein the first terminal is connected to the first signal line and the second terminal is connected to the second signal line;
a second surge voltage cut off device having first and second terminals, wherein the first terminal is connected to the first signal line;
a switching unit having a first terminal connected to the first signal line, a second terminal including a first contact point connected to the external apparatus, a third terminal connected to the second signal line, and a fourth terminal including a second contact point connected to the external apparatus connection unit and a third contact point connected to the second terminal of the second surge voltage cut off device; and a control unit which senses a signal received from the multi-function product and controls the second and fourth terminal of the switching unit to be switched between two of the first, second, and third contact points.

6. The apparatus of claim 5, wherein the control unit:

controls the second terminal of the switching unit to be switched to the first contact point and the fourth terminal of the switching unit to be switched to the second contact point in normal times or when the ring signal is received from the network connection unit; and controls the second terminal of the switching unit to be switched to the first contact point and the fourth terminal of the switching unit to be switched to the third contact point when the information signal is received from the network connection unit.

7. The apparatus of claim 6, wherein the information signal is one of a voice or a fax signal.

8. A method of protecting a multi-function product having a network connection unit which receives one of a ring signal, a voice signal, and a fax signal and transmits the signal via first and second signal lines and an external apparatus connection unit which is connected to an external apparatus, receives a data signal from the external apparatus from a surge voltage, the method comprising:

receiving a signal;

controlling a switch to switch one of a first contact point and a second contact point.

9. The method of claim 8, further comprises:

checking whether the signal is a ring signal or an information signal;

switching the contact point to the first contact point, if the signal is the ring signal; and switching the contact point to the second contact point, if the signal is the information signal.

10. The method of claim 9, wherein the information signal is any of a voice or a fax signal.

* * * * *

UNITED STATES PATENT AND TRADEMARK OFFICE
CERTIFICATE OF CORRECTION

PATENT NO. : 7,583,798 B2 Page 1 of 1
APPLICATION NO. : 11/168414
DATED : September 1, 2009
INVENTOR(S) : Eog-kyu Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1099 days.

Signed and Sealed this

Fourteenth Day of September, 2010

David J. Kappos
*Director of the United States Patent and Trademark Office*